United States Patent [19]

Nixon

[11] Patent Number: 4,731,605
[45] Date of Patent: Mar. 15, 1988

[54] REMOTE GARAGE DOOR OPENER CONVERSION

[76] Inventor: James E. Nixon, 2023 Belmont Ave., Youngstown, Ohio 44505

[21] Appl. No.: 17,132

[22] Filed: Feb. 20, 1987

[51] Int. Cl.⁴ .............................................. H04Q 9/14
[52] U.S. Cl. ................................ 340/696; 340/825.69; 340/825.72; 455/99
[58] Field of Search .............. 340/696, 825.69, 825.72; 455/99, 66

[56] References Cited

U.S. PATENT DOCUMENTS

| | | | |
|---|---|---|---|
| 2,588,879 | 3/1952 | Richards | 340/825.72 |
| 3,936,833 | 2/1976 | Bush | 340/696 |
| 4,241,870 | 12/1980 | Marcus | 340/696 |
| 4,247,850 | 1/1981 | Marcus | 340/696 |

FOREIGN PATENT DOCUMENTS 344278  3/1931  United Kingdom ................ 340/696

Primary Examiner—Glen R. Swann, III
Attorney, Agent, or Firm—Harpman & Harpman

[57] ABSTRACT

A remote garage door opener conversion relocates a typical battery operated garage door transmitter to a remote location in the automobile. The conversion has a remote mounting bracket and a voltage regulator to convert electrical current supplied by an automobile's electrical system to be used by the garage door transmitter. A remote activation switch for the garage door transmitter is positioned in a passenger compartment in the automobile.

4 Claims, 4 Drawing Figures

VOLTAGE REGULATOR

REMOTE GARAGE DOOR OPENER CONVERSION

BACKGROUND OF THE INVENTION

1. Technical Field

This invention relates to battery powered radio transmitters used to activate garage door opening devices from inside an auto.

2. Description of Prior Art

Prior Art devices of this type have relied on a variety of different transmitter configurations to open garage doors, see for example U.S. Pat. No. 4,241,870 and U.S. Pat. No. 4,247,850.

In U.S. Pat. No. 4,241,870 a remote transmitter and housing is disclosed that positions a housing within the passenger compartment of the vehicle that has a special transmitter whose power is supplied by the automobiles electrical system or when removed from the holder relies on battery power.

In U.S. Pat. No. 4,247,850 shows a garage door operator that is designed to be incorporated into a sun visor of an auto. The device uses power from the automobiles electrical system and includes a mirror to be mounted over the assembly.

SUMMARY OF THE INVENTION

A remote garage door opener conversion allows the use of any transmitter supplied by the manufacturer of a garage door opener to be relocated to the engine compartment of an automobile and coverts the transmitter to be powered by the electrical system of the auto. The conversion relocates the activation switch for the transmitter to the interior of the vehicle for convenience of use.

DESCRIPTION OF THE PREFERRED EMBODIMENT

Figure 3:
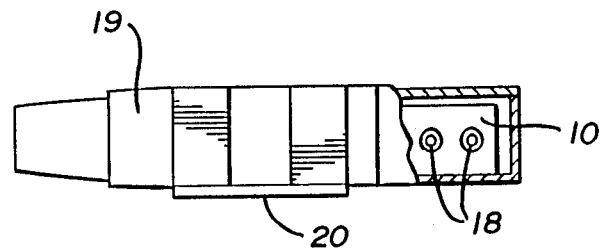
FIG. 3 is a side plan view of the transmitter FIG. 2.
Figure 2:
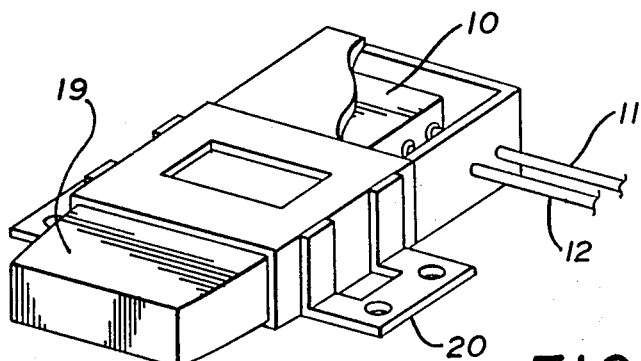
FIG. 2 is a perpsective view of a typical transmitter with a conversion of a voltage regulator in place of a battery.
Figure 4:
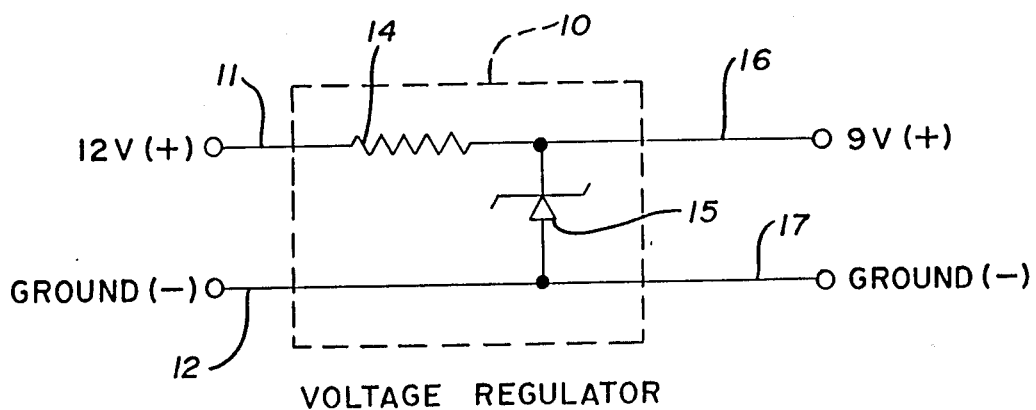
FIG. 4 is a schematic diagram of the circuit used in the voltage regulator.

An apparatus and process to convert remote garage door opener transmitters to be positioned within a vehicle at a remote location from the vehicles passenger compartment comprises a voltage regulator 10 seen in FIGS. 2, 3, and 4 of the drawings having power input lines 11 and 12 with input line 11 being positive and input line 12 being the ground. The input lines 11 and 12 extend from an electrical system (not shown) in an automobile 13. The voltage regulator 10 has a circuit comprised of a series resistor 14 and zener diode 15. The series resistor 14 is in this example a 100 ohm ½ watt resistor with a 5% tolerance and the zener diode used in this example is of a 9.1 volt with a 5% tolerance at 1 watt. The series resistor 14 is connected to the positive side of the circuit with the zener diode 15 extending between the positive side after the series resistor 14 to the negative side of the circuit. The input voltage is 12 V+ with a ground while the output of the voltage regulator 10 is 9 V+ with a ground exiting the voltage regulator via line 16 and 17. The voltage regulator has input terminals 18 matching those found on a 9 V battery which it takes the place of. A transmitter 19 is representative of any garage door battery operated transmitter operable with door openers used on garage doors presently on the market.

Figure 1:
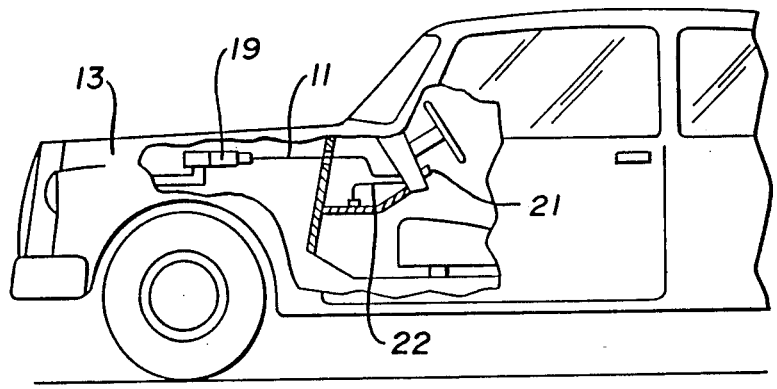
FIG. 1 is a broken away side view of a vehicle showing the repositioning of the transmitter to the engine compartment and relative location of the transmitters activation switch within the interior of the automobile.

Referring to FIG. 2 of the drawings a mounting bracket 20 can be seen which holds the transmitter 19 and provides for mounting same in the engine compartment of the vehicle as seen in FIG. 1 of the drawings. The process of the invention is comprised of the following steps.

1. Replacing the battery in the transmitter with a voltage regulator 10.

2. Permanently closing the existing transmitter switch so as to be in the closed transmit position.

3. Securing the transmitter in a mounting bracket in the engine compartment of the vehicle.

4. Mounting a single pole button 21 in the passenger compartment of the vehicle.

5. Inner-connecting the voltage regulator 10 with the transmit button 21 and the automobiles electrical system via supply lines 11, 12, 22.

In operation the transmitter is energized from the auto's electrical system upon activation of the relocated transmitter button 21 in the passenger compartment of the auto.

Thus it will be seen that a new and useful device has been illustrated and described and it will be apparent to those skilled in the art that various changes and modifications may be made therein without departing from the spirit of the invention.

Therefore I claim:

1. A process of converting a garage door opener transmitter having a battery within to be mounted in an automobile and powered by the automobile's electrical system comprising of the steps of:
   a. Replacing the battery within the transmitter with a voltage regulator,
   b. Permanently closing an activation switch on said transmitter,
   c. Securing said transmitter in an engine compartment of said automobile,
   d. Interconnecting a switch within said automobile to the automobile's electrical system and to said voltage regulator.

2. The process of converting a garage door opener transmitter of claim 1 wherein said voltage regulator is comprised of an electrical circuit having a series resistor connected in the positive side of said circuit and a zener diode connected between said series resistor and the negative side of said circuit.

3. The process of converting a garage door opener transmitter of claim 1 wherein securing the transmitter in the engine compartment of said automobile employs a mounting bracket.

4. The process of converting a garage door opener transmitter of claim 1 wherein the step of interconnecting a switch within said automobile (said automobile having a passenger compartment) comprises locating a single pole button switch in said passenger compartment and interconnecting said button switch to said electrical system and said voltage regulator in said engine compartment.

* * * * *